United States Patent
Ramisch

[15] 3,676,757
[45] July 11, 1972

[54] ELECTRIC CONDENSER WITH A FLAT TUBULAR DIELECTRIC

[72] Inventor: Emil Ramisch, Munich, Germany
[73] Assignee: Siemens Aktiengesellschaft, Berlin and Munich, Germany
[22] Filed: June 16, 1971
[21] Appl. No.: 153,560

[30] Foreign Application Priority Data

Sept. 3, 1970    Germany.....................P 20 43 770.1

[52] U.S. Cl.............................................317/242, 317/261
[51] Int. Cl. .......................................................H01g 1/14
[58] Field of Search.........................................317/242, 261

[56] References Cited

UNITED STATES PATENTS

| | | | |
|---|---|---|---|
| 2,793,333 | 5/1957 | Ehlers | 317/242 |
| 3,183,419 | 5/1965 | Reith | 317/242 |

Primary Examiner—E. A. Goldberg
Attorney—Carlton Hill et al.

[57]    ABSTRACT

A flat tubular condenser is provided with a longitudinal groove along each of its outer edges of an outer condenser plate to improve production during extrusion of the tubular plate and to provide improved connection of an electrical conductor in one of the grooves.

3 Claims, 2 Drawing Figures

PATENTED JUL 11 1972          3,676,757

INVENTOR
Emil Ramisch
BY
ATTYS.

ELECTRIC CONDENSER WITH A FLAT TUBULAR DIELECTRIC

BACKGROUND OF THE INVENTION

1. Field of the Invention

This invention relates to an electrical condenser having a ceramic dielectric in the form of a hollow tube which has oppositely poled condenser plates on the inner and outer surfaces of the ceramic tube, which condenser plates have attached thereto electrical terminal wires.

2. Description of the Prior Art

A condenser of the type described above is generally known in the art and has been disclosed in the German "Gebrauchsmuster" No. 1,996,588. Considerable difficulty has been encountered in attaching the electrical terminal leads to this type of condenser, particularly to the arcuate-shaped edges of the outer condenser plate. Experience has shown that considerable cost, in terms of time, money and material, is required in order to accomplish lead attachment to these arcuate surfaces in an automated manufacturing process.

SUMMARY OF THE INVENTION

It has been discovered that the provision of an inwardly extending groove in an arcuate surface of the outer condenser plate to receive one of the electrical conductor terminal leads greatly improves the electrical and mechanical connection between the lead and the plate and more readily facilitates automated fabrication.

It has been further found that if, in order to adjust the position of the terminal leads with more accuracy, a groove was provided in only one of the arcuate surfaces while the other arcuate surface remained arched toward the outside of the condenser, essential technical difficulties would result in the extrusion operation during the formation of the condenser plate in that uneven compressive forces are developed about the plate as it is extruded and the extrudate tends to curl up.

It is therefore the primary object of this invention to provide an electric condenser with a flat tubular dielectric member which has condenser plates on its inner and outer surfaces, which plates are free from the aforementioned drawbacks and has additional advantages of improved electrical and mechanical connection between the outer condenser plate and an electrical terminal lead, and an improved fabrication process.

BRIEF DESCRIPTION OF THE DRAWINGS

Other objects, features and advantages of the invention, its organization, construction and operation will be best understood from the following detailed description of an exemplary embodiment thereof taken in conjunction with the accompany drawing, in which.

DESCRIPTION OF THE PREFERRED EMBODIMENT

Figure 1:
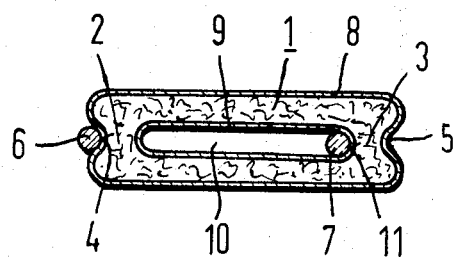
FIG. 1 is a sectional view of a tubular electric condenser taken along the line I—I of FIG. 2.
Figure 2:
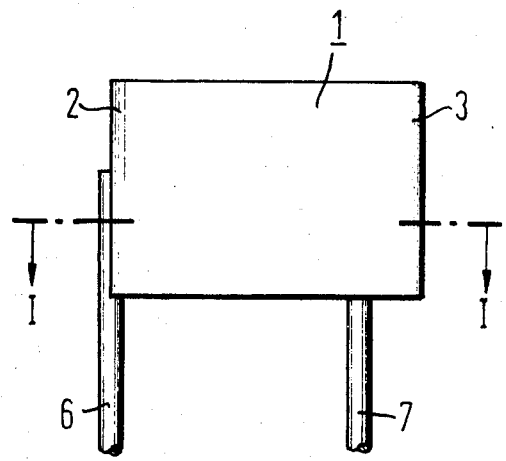
FIG. 2 is an elevational view of a tubular electric condenser, which condenser as illustrated particularly in FIG. 1 is constructed in accordance with the principles of the present invention.

Referring to FIG. 1, a generally tubular dielectric member 1 is provided with oppositely poled condenser plates, a condenser plate 8 being disposed on the outer surface of the dielectric member 1 and a condenser plate 9 being disposed on the inner surface of the dielectric member 1. The outer dielectric plate 8 is provided with a pair of grooves 4 and 5 during extrusion to improve the extrudate and to provide an improved means for attaching an electrical terminal lead. A conductor 6 is disposed in the groove 4 and secured to the condenser plate 8 in a manner well known in the art, and an electrical conductor 7 is disposed within the inner hollow space 10 of the condenser and attached to the inner condenser plate 9 in a rounded portion 11 of the plate 9. The reference characters 2 and 3 are provided to particularly point out that the grooves 4 and 5 and that the conductors 6 and 7 are provided at the narrowest sides of the condenser 1.

Many changes and modifications may be made in the invention by those skilled in the art by departing from the spirit and scope thereof, and it is to be understood that I intend to include within the patent warranted hereon all such changes and modifications as may reasonably and properly be included within the scope of my contribution to the art.

What I claim as my invention is:

1. In an electric condenser having a flat hollow tubular ceramic dielectric, and a flat hollow inner condenser plate disposed on the inner surface of the hollow dielectric, a flat hollow outer condenser plate disposed on the outer surface of the dielectric and a pair of electrical conductors connected to respective condenser plates, said condenser plates each having a pair of flat sides connected by a pair of arcuate sides, the improvement therein comprising the provision of an inwardly-directed, longitudinally-extending groove along at least one of the arcuate sides of said outer condenser plate, one of said conductors disposed in said groove and connected to the outer condenser plate, the other of said electrical conductors disposed within an arcuate side of said inner condenser plate and connected to said inner condenser plate.

2. The improvement set forth in claim 1, wherein said other electrical conductor is disposed within the arcuate side of said inner condenser plate which is more distant from said one groove than the other arcuate side of said inner conductor plate.

3. The improvement set forth in claim 1, wherein the outer condenser plate is an extruded plate, and comprising inwardly-directed, longitudinally-extending second groove in the other arcuate side of said outer condenser plate to equalize compressive forces during extrusion.

* * * * *